(12) United States Patent
Sela et al.

(10) Patent No.: US 12,001,711 B2
(45) Date of Patent: Jun. 4, 2024

(54) DETERMINE LINK STARTUP SEQUENCE (LSS) TYPE USING REFERENCE CLOCK FREQUENCY AND ATTRIBUTE

(71) Applicant: Western Digital Technologies, Inc., San Jose, CA (US)

(72) Inventors: Rotem Sela, Sunnyvale, CA (US); Shemmer Choresh, Tel-Aviv (IL)

(73) Assignee: Western Digital Technologies, Inc., San Jose, CA (US)

( * ) Notice: Subject to any disclaimer, the term of this patent is extended or adjusted under 35 U.S.C. 154(b) by 1 day.

(21) Appl. No.: 17/875,054

(22) Filed: Jul. 27, 2022

(65) Prior Publication Data

US 2023/0035584 A1     Feb. 2, 2023

Related U.S. Application Data

(60) Provisional application No. 63/226,080, filed on Jul. 27, 2021.

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0604; G06F 3/0655; G06F 3/0679
See application file for complete search history.

(56) References Cited

U.S. PATENT DOCUMENTS

| | | | |
|---|---|---|---|
| 2016/0005488 A1* | 1/2016 | Han | G11C 16/20 365/185.18 |
| 2018/0059159 A1* | 3/2018 | Hsu | H03K 5/19 |
| 2021/0263550 A1* | 8/2021 | Noh | G06F 3/0679 |
| 2021/0397569 A1* | 12/2021 | Song | G06F 13/1684 |
| 2022/0066689 A1* | 3/2022 | Jung | G06F 3/0635 |
| 2022/0199131 A1* | 6/2022 | Kim | G11C 7/109 |
| 2022/0222160 A1* | 7/2022 | Lee | G06F 1/203 |

* cited by examiner

*Primary Examiner* — Eric T Oberly
(74) *Attorney, Agent, or Firm* — PATTERSON + SHERIDAN, LLP (57) ABSTRACT

The present disclosure generally relates to utilizing the host clock signal frequency to determine whether to operate in the default pulse width modulation (PWM) link startup sequence (LSS), be changed to high speed (HS) LSS by a host device capable of operating in either PWM LSS or HS LSS, or ignore the data storage device attributes of operating in PWM LSS and instead operate according to HS LSS. In so doing, the data storage device is adaptable to work with older generation UFS host devices as well as current and future generation UFS host devices.

16 Claims, 6 Drawing Sheets

DETERMINE LINK STARTUP SEQUENCE (LSS) TYPE USING REFERENCE CLOCK FREQUENCY AND ATTRIBUTE

CROSS-REFERENCE TO RELATED APPLICATIONS

This application claims benefit of U.S. Provisional Patent Application Ser. No. 63/226,080, filed Jul. 27, 2021, which is herein incorporated by reference.

BACKGROUND OF THE DISCLOSURE

Field of the Disclosure

Embodiments of the present disclosure generally relate to determining link startup sequence (LSS) type using the reference clock frequency and attribute for Universal Flash Storage (UFS) in data storage devices, such as solid state drives (SSDs).

Description of the Related Art

UFS is an advanced, high performance interface designed for computing and mobile systems, such as smartphones and tablets, where power consumption needs to be minimal. The latest UFS interface protocols are optimized for efficient throughput, system performance, and reliability.

UFS is moving from a pulse width modulation (PWM) LSS startup to a high speed (HS) LSS. Previous generations of UFS (e.g., UFSv3.x) supported only PWM LSS. $4^{th}$ Generation UFS (e.g., UFSv4.x) supports both PWM LSS and HS LSS. Future generations (i.e., UFSv5.x) are expected to support HS LSS and not PWM LSS. Thus, data storage devices prior to the $4^{th}$ Generation will be unable to work with future generations while the $4^{th}$ Generation devices will be able to work with previous generation devices as well as future generation devices.

As the startup sequence is the first item that the UFS protocol processes, the host device and the data storage device do not know in which generation of UFS the other will operate. As an example, if a future host device operating only in HS LSS connects to a data storage device that is capable of operating in either PWM LSS or HS LSS, the data storage device needs to know to start with HS LSS and not PWM LSS.

Therefore, there is a need in the art for the data storage device to know to start in HS LSS and not PWM LSS.

SUMMARY OF THE DISCLOSURE

The present disclosure generally relates to utilizing the host clock signal frequency to determine whether to operate in the default pulse width modulation (PWM) link startup sequence (LSS), be changed to high speed (HS) LSS by a host device capable of operating in either PWM LSS or HS LSS, or ignore the data storage device attributes of operating in PWM LSS and instead operate according to HS LSS. In so doing, the data storage device is adaptable to work with older generation UFS host devices as well as current and future generation UFS host devices.

In one embodiment, a data storage device comprises: a memory device; and a controller coupled to the memory device, the controller configured to: set default universal flash storage (UFS) attributes to pulse modulation width (PWM) link startup sequence (LSS); receive a host reference clock signal from a host device, wherein the host reference clock signal has a frequency; determine that the frequency corresponds to a high speed (HS) LSS; ignore the default UFS PWM LSS; and operate as HS LSS while maintaining the default UFS PWM LSS attribute.

In another embodiment, a data storage device comprises: a memory device; and a controller coupled to the memory device, the controller configured to: set default universal flash storage (UFS) attributes to pulse modulation width (PWM) link startup sequence (LSS); receive a host reference clock signal from a host device, wherein the host reference clock signal has a frequency; receive instructions from the host device to change the UFS attributes to high speed (HS) LSS; change the default UFS attributes to HS LSS; and operate as HS LSS.

In another embodiment, a data storage device comprises: a memory device; and a controller coupled to the memory device, the controller configured to: set default universal flash storage (UFS) attributes to pulse modulation width (PWM) link startup sequence (LSS); determine that a frequency does not correspond to HS LSS, wherein the determining occurs without receiving a reference clock or receiving a reference clock signal from a host device, wherein the reference clock signal has the frequency; and operate as PWM LSS.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to utilizing the host clock signal frequency to determine whether to operate in the default pulse width modulation (PWM) link startup sequence (LSS), be changed to high speed (HS) LSS by a host device capable of operating in either PWM LSS or HS LSS, or ignore the data storage device attributes of operating in PWM LSS and instead operate according to HS LSS. In so doing, the data storage device is adaptable to work with older generation UFS host devices as well as current and future generation UFS host devices.

Figure 1:
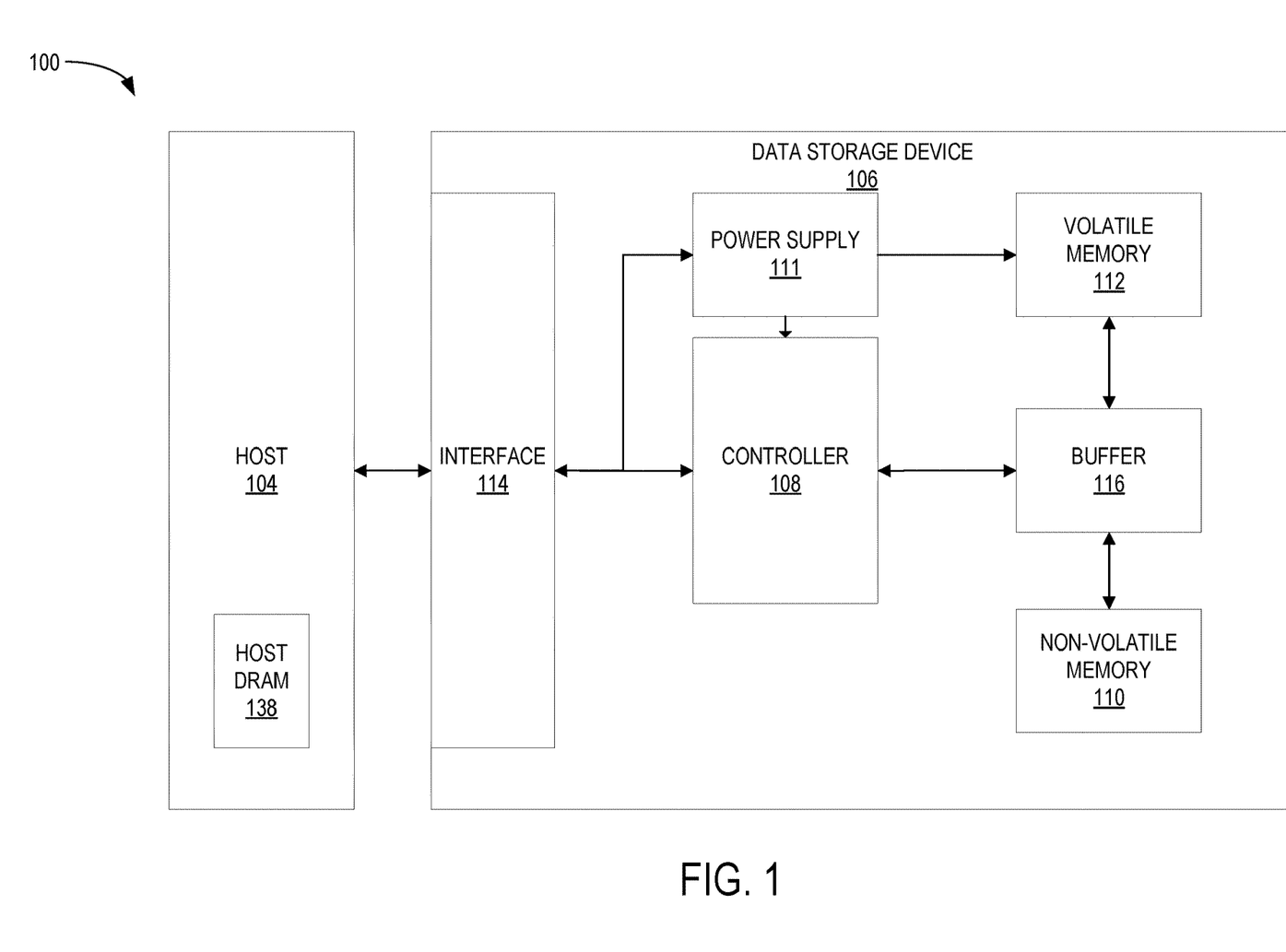
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.), and UFS BGA (e.g., 11.5 mm×13 mm for BA devices and 11.0 mm×13 mm for PBGA devices. In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), UFS, or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store the at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

For LSS, PWM LSS operates at low frequency. There are four typical frequencies supported for PWM LSS: 19.4 MHz, 26 MHz, 38.4 MHz, and 52 MHz. For LSS, HS LSS operates at high frequency: 76.8 MHz and 104 MHz. Thus, a UFS $3^{rd}$ Generation data storage device or host device will support 19.4 MHz, 26 MHz, 38.4 MHz, and 52 MHz (i.e., only PWM LSS); a UFS $4^{th}$ Generation data storage device can operate as PWM LSS or HS LSS and will typically support six frequencies: 19.4 MHz, 26 MHz, 38.4 MHz, 52 MHz, 76.8 MHz, and 104 MHz; a UFS $4^{th}$ Generation host device can operate as PWM LSS and will typically support four frequencies: 19.4 MHz, 26 MHz, 38.4 MHz, and 52 MHz; a UFS $5^{th}$ Generation data storage device or host device will support 76.8 MHz and 104 MHz (i.e., HS LSS only); and a UFS $5^{th}$ Generation data storage device or host device should also support legacy frequencies: 19.4 MHz, 26 MHz, 38.4 MHz, and 52 MHz.

Figure 2:
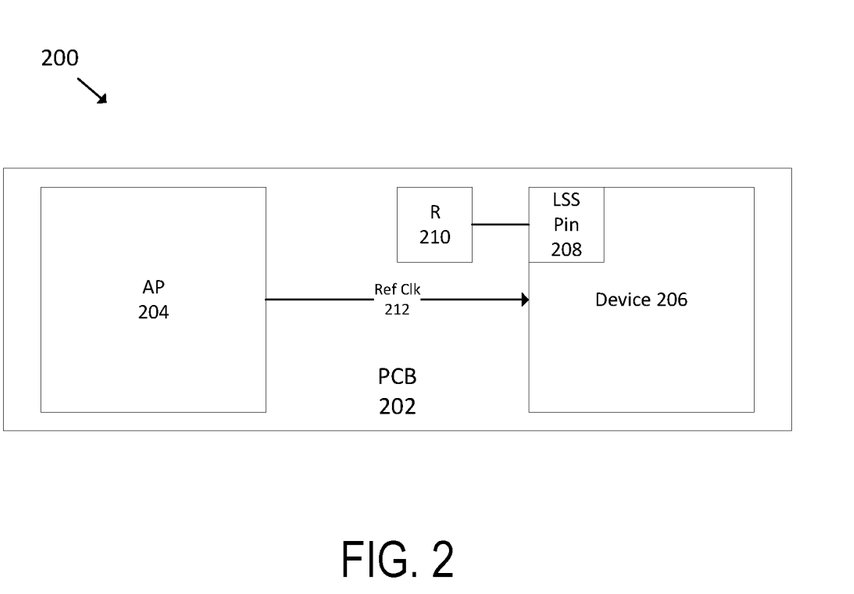
FIG. 2 is a schematic illustration of a storage system according to one embodiment.

FIG. 2 is a schematic illustration of a storage system 200 according to one embodiment. The storage system 200 includes a printed circuit board (PCB) 202 having coupled thereto a data storage device 206 and an application processor (AP) 204. The data storage device 206 includes a LSS pin 208 that is coupled to a resistor 210. The resistor 210 is coupled to the PCB 202, but the resistor 210 is not directly coupled to the AP 204. Hence, the data storage device 206 receives a fixed signal from the resistor 210. The resistor 210, depending upon the reference clock signal 212, either pulls up or pulls down to create the fixed signal. The fixed signal will be either a low frequency corresponding to PWM LSS or a high frequency corresponding to HS LSS. The AP 204, which may be considered a host device, delivers a reference clock signal 212 to the data storage device 206.

Figure 3:
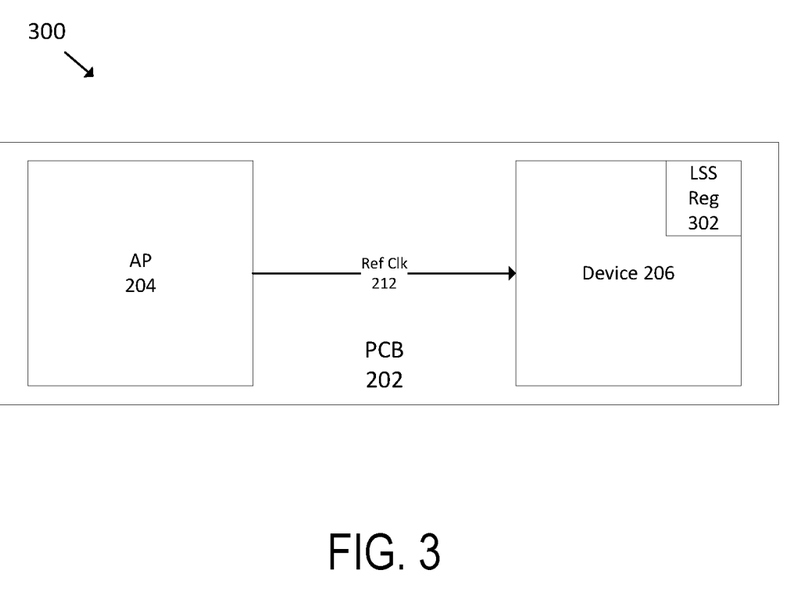
FIG. 3 is a schematic illustration of a storage system according to another embodiment.

FIG. 3 is a schematic illustration of a memory system 300 according to another embodiment. As shown in FIG. 3, neither the resistor 210 nor the LSS pin 208 are present. Rather, a LSS register 302 is present in the data storage device 206. The reference clock signal 212, rather than the resistor 210 and LSS pin 208, is used to determine whether the data storage device operates as PWM LSS or HS LSS as will be discussed below. In the embodiments discussed below, the data storage device is a $4^{th}$ Generation UFS data storage device and hence, can operate according to either PWM LSS or HS LSS.

Figure 4:
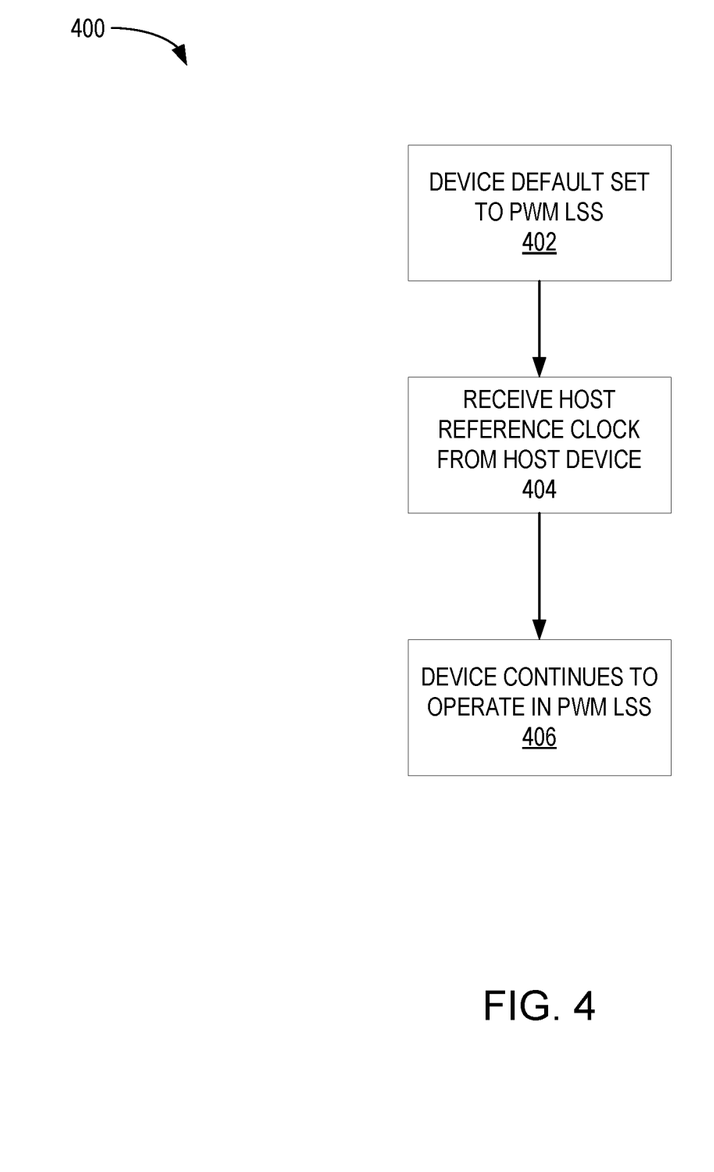
FIG. 4 is a flow diagram illustrating a method of connecting a $4^{th}$ Generation data storage device to a $3^{rd}$ Generation host device.

FIG. 4 is a flow diagram 400 illustrating a method of connecting a $4^{th}$ Generation data storage device to a $3^{rd}$ Generation host device. As a $3^{rd}$ Generation device is only capable of operating under PWM LSS, the HS LSS capabilities of the $4^{th}$ Generation data storage device will be irrelevant to the $3^{rd}$ Generation host device. Initially, the data storage device has the default attributes set to PWM LSS at 402. The data storage device receives the host reference clock signal from the host device at 404. Again, because the host device is a $3^{rd}$ Generation UFS device, the host device is not capable of operating under the HS LSS parameters. Thus, the data storage device will continue to operate according to the default attributes of PWM LSS at 406, and the default attributes will not change.

If the data storage device had been a $3^{rd}$ Generation UFS device, then the attributes would still be set at PWM LSS as PWM LSS would be the only possible attributes for a $3^{rd}$ Generation UFS data storage device. Similarly, the host device, being a $3^{rd}$ Generation UFS host device, would start using reference clock signals that are PWM LSS as PWM LSS are the only possible reference clock signals that a $3^{rd}$ Generation UFS host device can send. If, however, the host device were a $3^{rd}$ Generation UFS host device, and the data storage device was a $5^{th}$ Generation UFS data storage device, then the host device and data storage device would not be compatible because the $5^{th}$ Generation UFS data storage device would not support PWM LSS.

Figure 5:
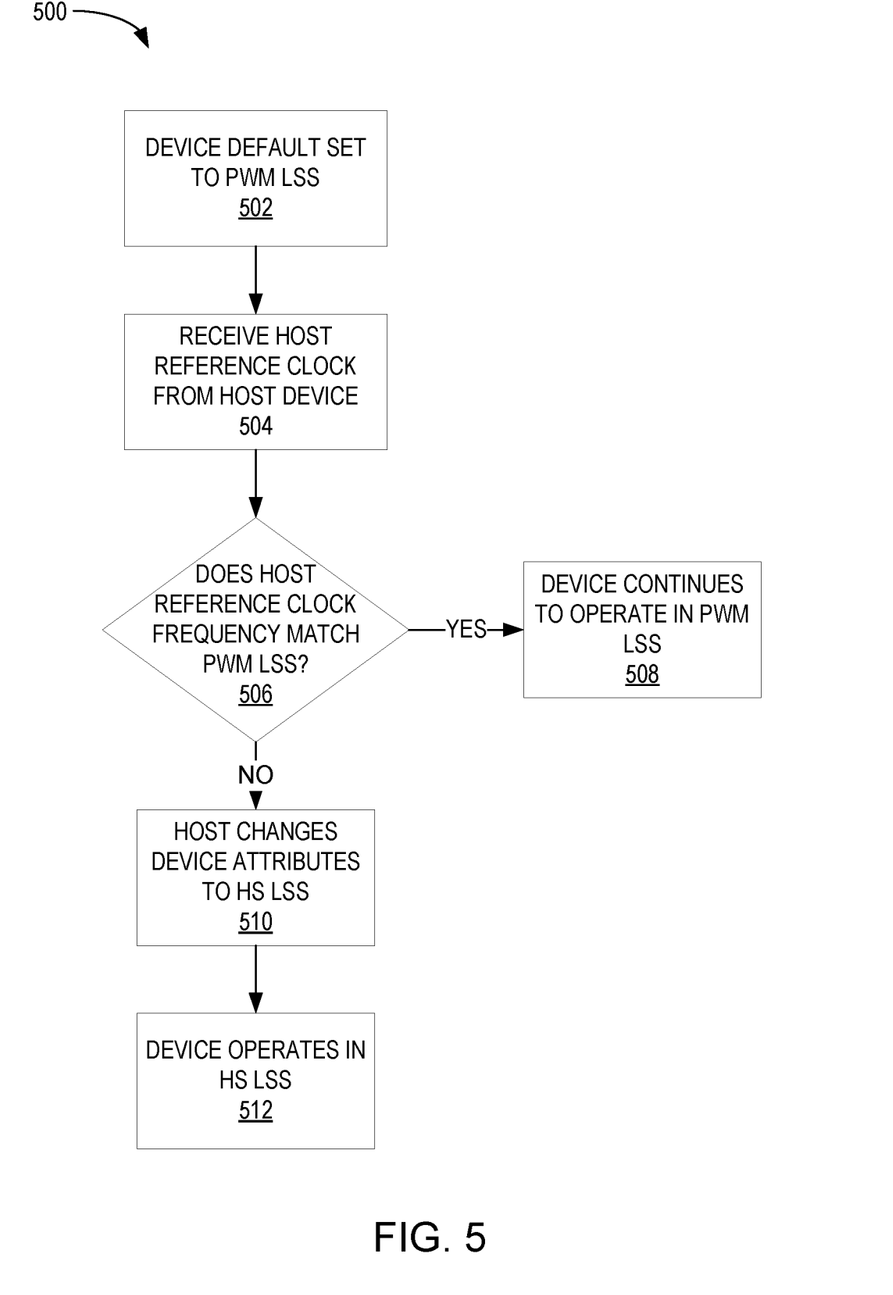
FIG. 5 is a flow diagram illustrating a method of connecting a $4^{th}$ Generation data storage device to a $4^{th}$ Generation host device.

FIG. 5 is a flow diagram illustrating a method of connecting a $4^{th}$ Generation data storage device to a $4^{th}$ Generation host device. In this scenario, both the host device and the data storage device are $4^{th}$ Generation UFS devices. Hence, both devices are capable of operating according to PWM LSS or HS LSS. Initially, the data storage device has the default attributes set to PWM LSS at 502. The data storage device receives the host reference clock signal from the host device at 504. If the host reference clock signal frequency matches the data storage device attributes of PWM LSS at 506, then the data storage device continues to operate in PWM LSS at 508. However, if the host reference clock signal frequency does not match the data storage device attributes of PWM LSS at 506, then the host device changes the data storage device attributes to HS LSS at 510 and then the data storage device operates in HS LSS mode at 512.

It should be noted that for a $4^{th}$ Generation UFS host device, the host device has internal indications to start in PWM LSS mode and switch to HS LSS if the data storage device is compatible. Hence, for a situation where both the host device and data storage device are $4^{th}$ Generation UFS devices, under the default attributes of the data storage device, both the host device and the data storage device, at first power on, will be PWM LSS. The host device may then configure the data storage device to change the attributes to be HS LSS. At the next power on, the host has an internal indication to start in HS LSS as does the data storage device due to the change in attributes.

If, in another scenario, the host device was $4^{th}$ Generation UFS, but the data storage device was $5^{th}$ Generation UFS, then the data storage device would start in HS LSS (because there is no other option for a $5^{th}$ Generation UFS device), and the host device would have an internal indication to start in HS LSS. If the host device was a $4^{th}$ Generation UFS device, but the data storage device was a $3^{rd}$ Generation UFS device, then the data storage device would start and always operate in PWM LSS mode while the host device would have an indication to start in PWM LSS.

Figure 6:
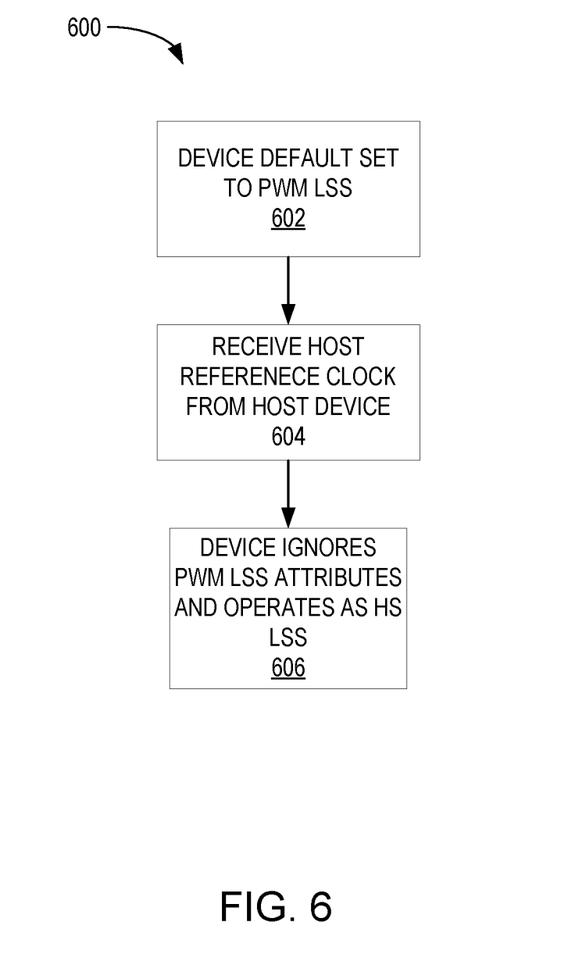
FIG. 6 is a flow diagram illustrating a method of connecting a $4^{th}$ Generation data storage device to a $5^{th}$ Generation host device.

FIG. 6 is a flow diagram 600 illustrating a method of connecting a $4^{th}$ Generation data storage device to a $5^{th}$ Generation host device. Initially, the data storage device has the default attributes set to PWM LSS at 602. The data storage device receives the host reference clock signal from the host device at 604. The host reference clock signal will be HS LSS because the host device is a $5^{th}$ Generation UFS device. The data storage device, being a $4^{th}$ Generation UFS device with default attributes of PWM LSS, will ignore the default attributes of PWM LSS and instead operate as HS LSS at 606. Because the host device is $5^{th}$ Generation, the host device will not change the data storage device attributes from PWM LSS to HS LSS. The data storage device will have to recognize the reference clock signal frequency and operate accordingly, and ignore the default attributes of PWM LSS.

In the case where both the host device and the data storage device are $5^{th}$ Generation UFS devices, both devices will, from initial startup, operate according to HS LSS. In another scenario, if the host device is a $5^{th}$ Generation UFS device while the data storage device is a $3^{rd}$ Generation device, the devices would not be compatible.

By utilizing the clock signal frequency from the host device, a data storage device that can operate in both PWM LSS and HS LSS can effectively communicate with the host device. For generational matches (i.e., both devices are $3^{rd}$ Generation, both devices are $4^{th}$ Generation, or both devices are $5^{th}$ Generation), the devices are compatible and can operate according to whatever frequency at which the host device operates. For a $4^{th}$ Generation data storage device, however, the data storage device is compatible with any of $3^{rd}$-$5^{th}$ Generation and can: maintain default attributes of PWM LSS for $3^{rd}$ Generation host device connections, maintain default attributes of PWM LSS or change default attributes to HS LSS at instruction of host device for $4^{th}$ Generation host device connections, or ignore default PWM LSS attributes and operate instead according to HS LSS without actually changing default attributes for $5^{th}$ Generation host device connections.

In one embodiment, a data storage device comprises: a memory device; and a controller coupled to the memory device, the controller configured to: set default universal flash storage (UFS) attributes to pulse modulation width (PWM) link startup sequence (LSS); receive a host reference clock signal of a clock signal from a host device, wherein the host reference clock signal has a frequency; determine that the frequency corresponds to a high speed (HS) LSS; ignore the default UFS PWM LSS; and operate as HS LSS while maintaining the default UFS PWM LSS attribute. The data storage device further comprises: a printed circuit board (PCB); a LSS pin; and a resistor. The resistor is not directly coupled to the host device. The LSS pin is coupled to the resistor. The resistor is coupled to the PCB. The resistor is configured to either pull up or pull down to create a fixed signal, wherein the fixed signal corresponds to either a low frequency corresponding to PWM LSS or a high frequency corresponding to HS LSS. The host device is an application processor (AP). PWM LSS operates at 19.4 MHz, 26 MHz, 38.4 MHz, or 52 MHz. HS LSS operates at 78.6 MHz or 104 MHz. The host device has an internal indication for whether to start in HS LSS or PWM LSS.

In another embodiment, a data storage device comprises: a memory device; and a controller coupled to the memory device, the controller configured to: set default universal flash storage (UFS) attributes to pulse modulation width (PWM) link startup sequence (LSS); receive a host reference clock signal from a host device, wherein the host reference clock signal has a frequency; receive instructions from the host device to change the UFS attributes to high speed (HS) LSS; change the default UFS attributes to HS LSS; and operate as HS LSS. The host device is a $5^{th}$ Generation UFS device. The data storage device is a $4^{th}$ Generation UFS device. The host device is a $4^{th}$ Generation UFS device. The data storage device further comprises a LSS register. Changing the default UFS attributes comprises is performed by the LSS register. Changing the default UFS attributes is performed by a resistor and a LSS pin. The host device is an application processor (AP), wherein the data storage device comprises a printed circuit board (PCB) and either: a resistor and a LSS pin; or a LSS register.

In another embodiment, a data storage device comprises: a memory device; and a controller coupled to the memory device, the controller configured to: set default universal flash storage (UFS) attributes to pulse modulation width (PWM) link startup sequence (LSS); determine that a frequency does not correspond to HS LSS, wherein the determining occurs without receiving a reference clock or receiving a reference clock signal from a host device, wherein the reference clock signal has the frequency; and operate as PWM LSS. The data storage device is a smartphone or tablet.

While the foregoing is directed to embodiments of the present disclosure, other and further embodiments of the disclosure may be devised without departing from the basic scope thereof, and the scope thereof is determined by the claims that follow.

What is claimed is:
1. A data storage device, comprising:
a memory device; and
a controller coupled to the memory device, the controller configured to:

set first default link attributes to a first frequency at a first power on, wherein the first default link attributes is a pulse width modulation (PWM) link startup sequence (LSS);
receive a host reference clock signal from a host device, wherein the host reference clock signal has a second frequency and second default link attributes different from the first default link attributes, wherein the second default link attributes is a high speed (HS) LSS;
determine that the second frequency is higher than the first frequency;
ignore the first frequency;
operate at the second frequency while maintaining the first default link attributes; and
change from the first default link attributes to the second default link attributes at a second power on.

2. The data storage device of claim 1, further comprising:
a printed circuit board (PCB);
a pin; and
a resistor.

3. The data storage device of claim 2, wherein the resistor is not directly coupled to the host device.

4. The data storage device of claim 2, wherein the pin is coupled to the resistor.

5. The data storage device of claim 4, wherein the resistor is coupled to the PCB.

6. The data storage device of claim 2, wherein the resistor is configured to either pull up or pull down to create a fixed signal, wherein the fixed signal corresponds to either a low frequency corresponding to first frequency or a high frequency corresponding to the second frequency.

7. The data storage device of claim 1, wherein the host device is an application processor (AP).

8. The data storage device of claim 1, wherein first frequency operates at 19.4 MHZ, 26 MHZ, 38.4 MHZ, or 52 MHz.

9. The data storage device of claim 1, wherein the second frequency operates at 78.6 MHz or 104 MHz.

10. The data storage device of claim 1, wherein the host device has an internal indication for whether to start in the second frequency or the first frequency.

11. A data storage device, comprising:
a memory device; and
a controller coupled to the memory device, the controller configured to:
set default link attributes to a first frequency at a first power on, wherein the default link attributes is a PWM LSS;
receive a host reference clock signal from a host device, wherein the host reference clock signal has a second frequency and a second link attributes different from the default link attributes;
receive instructions from the host device to change the link attributes to the second frequency;
change the default link attributes to the second link attributes;
operate as the second frequency with the second link attributes at a second power on, based on the change, wherein the second link attributes is a HS LSS.

12. The data storage device of claim 11, wherein the host device is a 4th Generation UFS device.

13. The data storage device of claim 11, comprising a register.

14. The data storage device of claim 13, wherein changing the default link attributes is performed by a LSS register.

15. The data storage device of claim 11, wherein changing the default link attributes is performed by a resistor and a pin.

16. The data storage device of claim 11, wherein the host device is an application processor (AP), wherein the data storage device comprises a printed circuit board (PCB) and either:
a resistor and a pin; or
a register.

* * * * *